Sept. 2, 1952  P. SALISBURY-ROWSWELL  2,609,407
SECONDARY GALVANIC CELLS AND ELECTRODES OF SUCH CELLS
Filed May 26, 1948  4 Sheets-Sheet 1
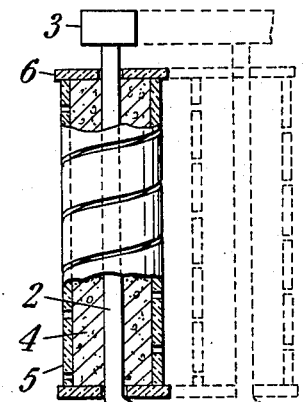
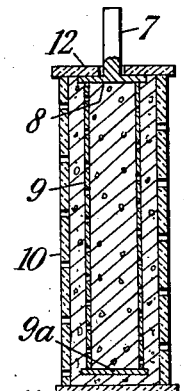
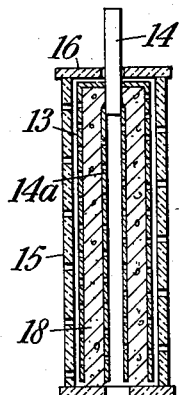
Fig. 1   Fig. 2   Fig. 3
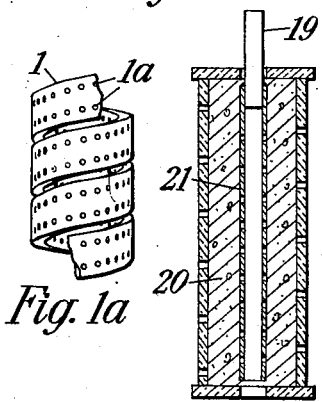
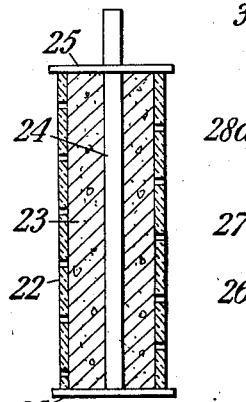
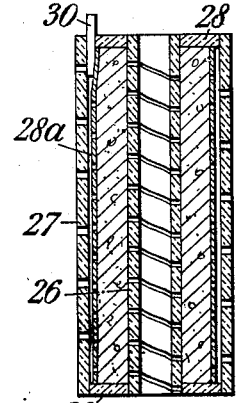
Fig. 1a   Fig. 4   Fig. 5   Fig. 6
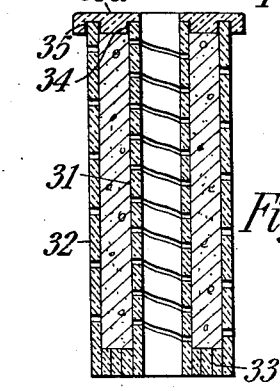
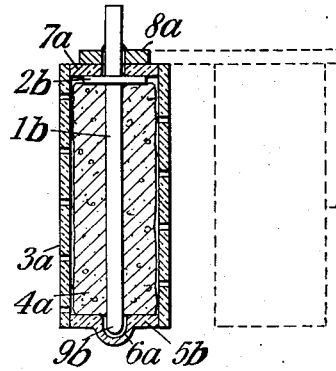
Fig. 7   Fig. 8a
INVENTOR
PELHAM SALISBURY-ROWSWELL
BY Ely & Frye
ATTORNEYS

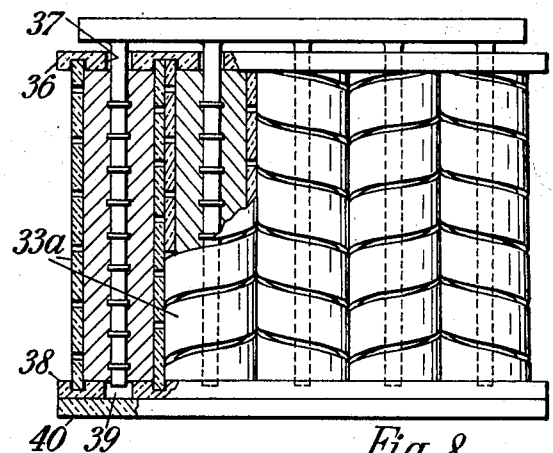
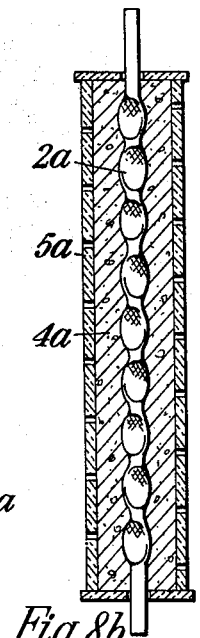
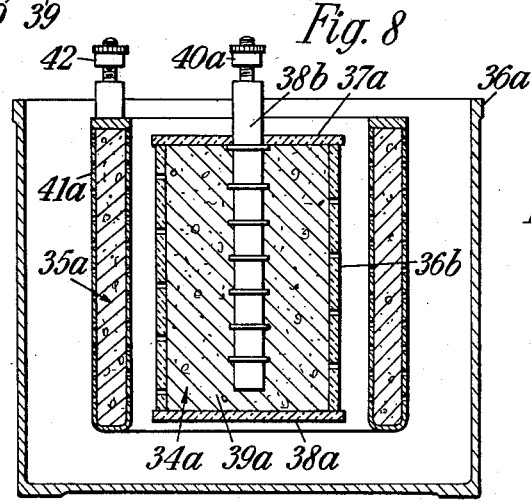
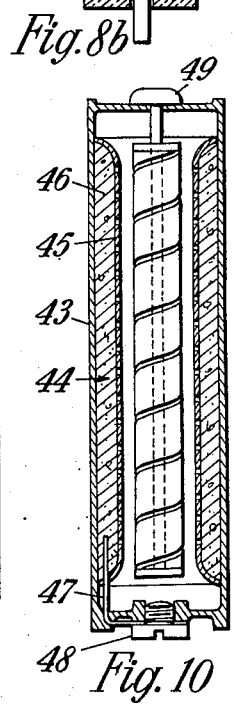
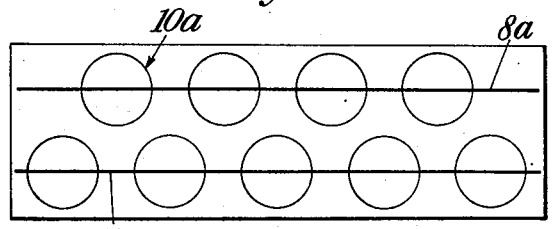

Sept. 2, 1952   P. SALISBURY-ROWSWELL   2,609,407
SECONDARY GALVANIC CELLS AND ELECTRODES OF SUCH CELLS
Filed May 26, 1948   4 Sheets-Sheet 3
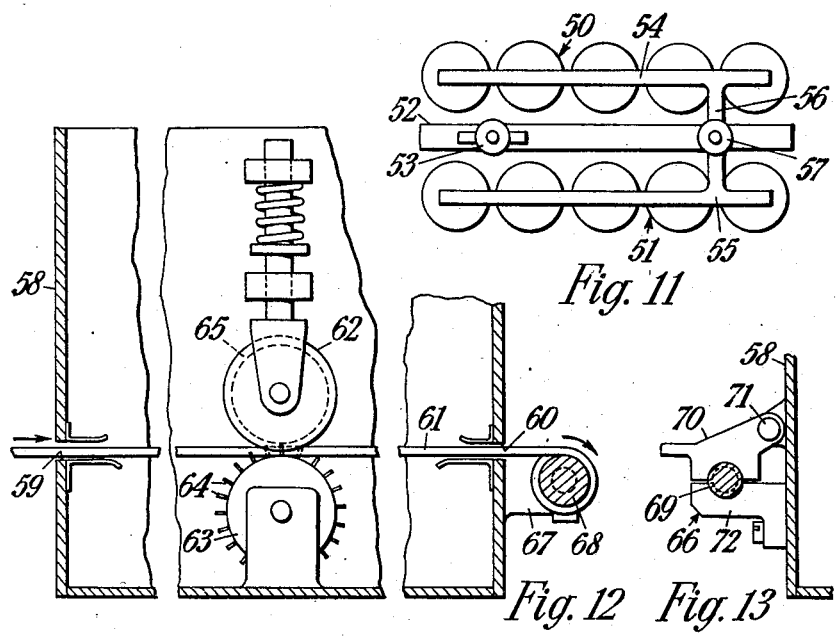
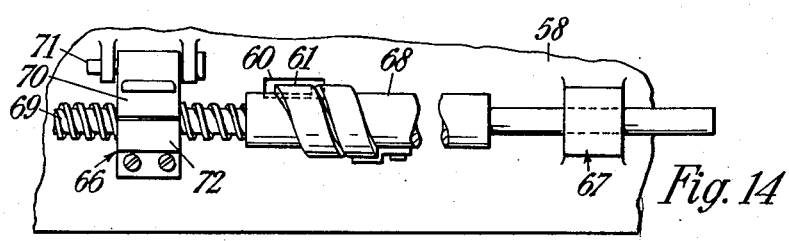
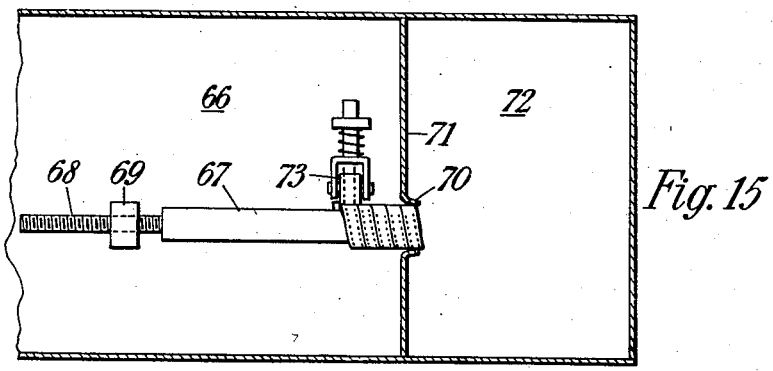
INVENTOR
PELHAM SALISBURY-ROWSWELL
BY Ely & Frye
ATTORNEYS Sept. 2, 1952   P. SALISBURY-ROWSWELL   2,609,407
SECONDARY GALVANIC CELLS AND ELECTRODES OF SUCH CELLS
Filed May 26, 1948   4 Sheets-Sheet 4

INVENTOR
PELHAM SALISBURY-ROWSWELL
BY  Ely & Frye
ATTORNEYS

Patented Sept. 2, 1952

2,609,407

UNITED STATES PATENT OFFICE 2,609,407

SECONDARY GALVANIC CELLS AND ELECTRODES OF SUCH CELLS

Pelham Salisbury-Rowswell, London, England

Application May 26, 1948, Serial No. 29,323
In Great Britain November 22, 1947

6 Claims. (Cl. 136—55)

This invention relates to electric accumulators or storage batteries, for example, of the lead-lead peroxide type and iron or nickel or cadmium types.

The electrodes of such batteries are subject to deterioration due to growth or expansion of the active material and its shedding during use and buckling due to ill use and various proposals have been made for reducing or avoiding such defects. Thus retainers for the active material have been employed which in the case of pencil or rod form electrodes either single, or in the form of a plate comprising a plurality of parallel pencils or rods, were each provided with a sleeve which permitted access of electrolyte to the active material therein but made of material inert to the electrolyte and action which takes place when the battery is in use or being charged.

The primary object of the invention is to provide an improved retaining sleeve which is simple to manufacture and which when in use will readily expand with growth or expansion of the active material.

A further object of the invention is to provide electric accumulators or storage batteries embodying such electrodes whereby their more efficient operation is attained.

A still further object is to provide a method of and apparatus for manufacture of the improved sleeves.

The invention comprises an electrode for secondary cells or accumulators comprising active material in contact with a conductor, the active material being retained by a sleeve of plastic material inert to the electrolyte, helically formed and transversely perforate or imperforate whereby electrolyte can obtain access to the active material through the space between adjacent edges of the helical turns of the sleeve or through the perforations or both, and the sleeve can expand under the action of expansion or growth of the active material.

It is essential that the plastic material employed be acid resistant and a non-conductor of electricity and one example of synthetic plastic material is methyl methacrylate. Other suitable thermo-plastic materials are hard, natural, or synthetic rubber, styrenes, polystyrene and methyl methacrylates in unplasticised state and which are porous. Further the character of the sleeve must be such as to provide for deformation under the action of growth or expansion of the active material and recovery from deformation if shrinkage or contraction of the active material takes place after growth whereby the sleeve will always firmly engage the active material.

Referring now to the accompanying drawings:

Figure 1 is a sectional elevation of a pencil or rod form electrode according to the invention, the figure also illustrating in dotted lines how a further pencil or pencils may be assembled together to provide a multi-pencil plate or electrode.

Figure 1a is an elevation showing a slight modification.

Figures 2, 3, 4, 5 and 6 and 7, 8, 8a and 8b are each a sectional elevation of a modified form of electrode.

Figure 9 is a sectional elevation of a complete secondary battery according to the invention.

Figure 9a is a diagrammatic representation of a four pencil positive plate and a five pencil negative plate in which the pencils are according to Figure 8a.

Figure 10 is a sectional elevation of a battery suitable for hand torches.

Figure 11 is a diagrammatic plan view of the arrangement of positive and negative plates according to the invention.

Figures 12, 13 and 14 are respectively a sectional side elevation, part sectional side elevation and plan of apparatus for making the retaining sleeves, and Figure 15 is a sectional elevation of a modified form of apparatus for making the retaining sleeves.

Figure 16:
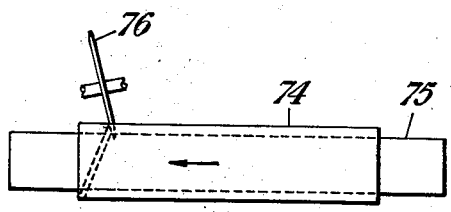
Figure 17:
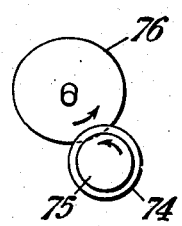

Figures 16 and 17 are respectively a side elevation and end view of a further modified form of manufacture of a retaining sleeve, the views being diagrammatic.

Figure 18:
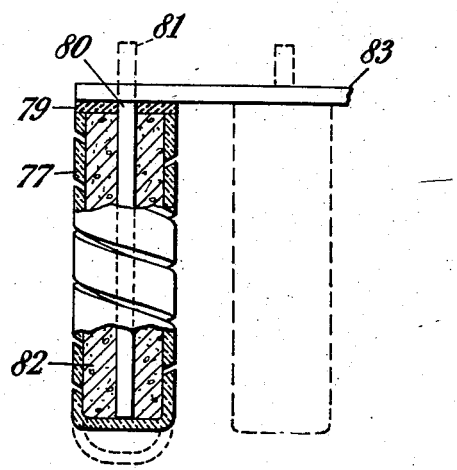
Figure 19:
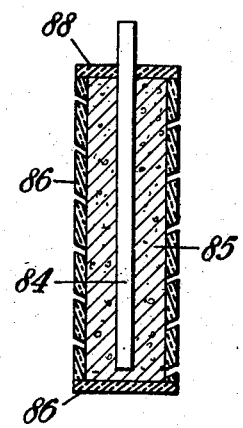

Figure 18 is a sectional elevation of a positive electrode in which a further modified form of retaining sleeve is illustrated, and Figure 19 is a sectional elevation of a positive electrode showing another modification of the retaining sleeve.

Figure 1a is a portion of a thermo-plastic retaining sleeve 1 which can be formed by helically winding a heated strip of thermo-plastic resin, methyl methacrylate, for example, on to a rod or mandrel of cylindrical or other cross section so that the edges of the coils or convolutions are slightly spaced apart and then allowing the sleeve to cool. The strip before being wound on to the mandrel may be pierced while heated so as to provide a plurality of small passages 1a transversely through the strip. After the sleeve has cooled to normal temperature it is slid off the mandrel or rod and is then ready for assembly with other parts to manufacture an electrode. Before, however, describing such manufacture it may be stated that the sleeve has the physical attributes of a compression spring inasmuch as it can be expanded axially by holding one end stationary and pulling on the other or pulling both ends simultaneously and when it is released it will contract to its initial condition. If therefore active paste be held as by friction or other means within the sleeve and the paste expands or grows, the sleeve will expand to allow for said growth and contract when the paste contracts. Further if the ends of the sleeve are each in a plane at right angles to the axis and the sleeve fits between two fixed members which abut the ends of the sleeve, expansion or growth of active paste filling the interior of the sleeve will be confined to radial expansion and the helical sleeve will be expanded radially so that its diameter will increase but it will resume its former diameter if the paste subsequently contracts.

The transverse passages should not exceed 1/64 of an inch in diameter and they provide for increased access of electrolyte to the active material.

Referring now to Figure 1 which shows a positive electrode for a lead-lead peroxide storage battery or accumulator, there is provided a rod of lead 2 depending from a terminal lug 3. Surrounding the rod intermediate its ends and in contact therewith is a cylindrical body 4 of active material which is surrounded by an imperforate sleeve 5 of thermoplastic material, as hereinbefore described, the adjacent edges of the helical convolutions being slightly spaced apart to permit electrolyte to gain access to the paste. The upper end of the sleeve is covered by a ring 6 of the same thermoplastic material as the sleeve and the ring is united with the upper end of the sleeve by applying solvent to one or both the members and pressing them together until they are integrally united.

A ring of the same thermoplastic material as the sleeve is also united with the lower end thereof by the employment of a solvent and the lower end portion of the lead rod, which extends through the openings in the rings, is bent so as to underlie the lower ring. The rings slidably fit the rod and when an electrode, according to the foregoing description, is in use in a battery and growth or expansion of the active paste occurs, the sleeve will also expand axially, the upper ring under action of such expansion sliding upwardly on the rod. If subsequent shrinkage or contraction of the paste occurs, the helical sleeve will resume its initial unstressed condition, the upper ring returning to its initial position relatively to the rod. This figure also shows in dotted lines how another electrode element may be assembled with the electrode above described to provide a two or if required a three or more multipencil electrode or plate, the lead rods of both or all the rods being secured to a common lead bar, as shown in dotted lines, by burning, the bar being provided with a suitable terminal lug (not shown).

The active material may be formed into a briquette having a central passage for the rod, the briquette being inserted into the sleeve before one of the rings is secured in place. The rod can then be slid through the central passage in the active material and the openings in the rings until the forward end of the rod projects below the lower ring, Figure 1. Finally the projecting portion of the rod is bent over at right angles to support on the rod the enclosure formed by the retaining sleeve and the rings, and its content of active material.

Alternatively the active material may be formed in situ during charging of a battery by filling the cylindrical space between the rod and the sleeve with pure red lead powder or paste containing such material, it being understood that such filling will be effected before one of the rings is secured in place.

In Figure 2 a lead conducting rod 7 is provided which has burned thereto a lead disc 8, which disc has burned thereto and depending therefrom a perforated tube of thin lead 9, the lower end of which has burned thereto a disc of lead 9a. This structure carries retaining means comprising as hereinbefore described, a sleeve 10 closed at the lower end by a disc 11 of thermoplastic material and has at the other end a ring 12 secured thereto through which the rod 7 extends and on which the ring can slide. Te space between the sleeve and the lead tube and the interior of the latter are filled with active material.

A further modified form of pencil electrode is shown in Figure 3, and in this form of the invention the active material is contained in a perforated lead tube 13 closed at its upper end by a ring of lead burned to the conducting rod 14. The tube 13 substantially fits the interior of a retaining sleeve 15 provided with top and bottom rings 16 and 17 secured to the sleeve. The interior of the lead tube is filled with active material 18. As shown another lead tube 14a may extend downwardly from the rod 14 which may or may not be filled with active material.

In Figure 4 there is shown a further form in which the lower end of a lead conducting rod 19 projects into active material 20 within a retaining sleeve having end rings as described with reference to Figure 1, the rod having depending therefrom and burned thereto a perforated tube of lead 21 which may or may not be filled with active paste. In the latter case electrolyte fills and can circulate in the lead tube and gain access to the paste through the perforations in the latter.

Figure 5 shows a further modified form in which a retaining sleeve 22 surrounds a body of active material 23 in contact with a central rod of lead 24, the latter having secured thereto, as by burning, lead discs 25 which cover the upper and lower ends of the sleeve but are not secured to the latter.

As will be appreciated in this form of the invention, expansion of the active paste will cause expansion of the sleeve radially of the rod as the sleeve has its ends prevented from movement axially by the discs 25.

Referring now to Figure 6, a positive pencil electrode is shown, having inner and outer spaced retaining sleeves 26, 27, the upper and lower ends of the annular space thus afforded between the sleeves being closed by rings 28, 29. A tubular member 28a of perforated lead is located within the outer retaining sleeve and is spaced from the latter, a conducting rod 30 projecting downwardly into said space through a notch in the upper ring 28 and being burned to the tubular member 28a. Active paste fills the space between the inner sleeve and the lead tube and it will be appreciated that electrolyte can gain access to the active material exteriorly and interiorly thereof.

Figure 7 shows how a strip of thermo-plastic material can be wound to provide spaced inner and outer retaining sleeves 31, 32 and a bottom closure 33 for the annular space between them. The annular space is filled with the active paste and a lead rod or other member may project downwardly through a cover ring secured to the upper ends of the sleeves, into the active paste. The cover ring 33a is of thermo-plastic material and has on its underside annular grooves 34, 35 into which the upper portions of the sleeves extend, the sleeves and cover ring being integrated during manufacture of the pencil by the employment of a solvent which is introduced into the grooves, the sleeves being then applied to the cover ring with their upper ends in the grooves.

It will be seen that the bottom closure 33 is formed by a plurality of concentric windings of the strip and it will also be seen that the depth of the strip material forming the inner sleeve and the concentric windings is less than that forming the outer sleeve. In forming the sleeves the strip is first preformed accordingly, the narrower portion being then helically wound on to a metal mandrel, leaving sufficient of its length for the winding of the concentric convolutions. The latter are then wound and a tubular metal mandrel is slid on to the sleeve already formed and the wider portion of the strip is then wound on to the tubular mandrel. The mandrels are withdrawn from the sleeves after the latter have cooled to normal temperature and the sleeves are then assembled with the cover ring 33a.

It will be understood that when growth or expansion of the paste takes place it will act axially of the concentric windings and extend both the inner and outer sleeves.

In Figure 8 a multi-pencil positive electrode or plate is shown comprising a plurality of retaining sleeves 33a which are alternately wound in the opposite sense, the upper ends of the sleeves being united by solvent to a bar 36 which has openings 37 therethrough coaxial with the sleeves. The lower ends of the sleeves are similarly united to a bar 38 also having openings 39 coaxial with the sleeves, and a cover bar 40 unprovided with openings is secured by solvent to the bar 38. Each sleeve has a lead rod extending downwardly thereinto, the rods extending through the openings 37 substantially to the lower portions of the sleeves.

The rods are provided with outwardly projecting collars, tongues or spikes, and active material fills the spaces between the rods and the sleeves. The projecting collars, tongues or spikes hold the active material in position on the rods. The rods are each burned at their upper ends to a lead bar having a terminal lug (not shown) integral therewith. The openings in the upper thermoplastic bar are such that said bar can slide thereon if growth or expansion of the active material occurs, it being understood that such expansion will act to move the upper and lower bars in opposite directions.

A suitable form of lead rod 2a for long pencils is shown in Figure 8b and can be made by pressing a circular rod to form connected oval plate portions alternately in planes at right angles to each other.

Figure 8b also shows a helical sleeve 5a assembled with the rod, and active material 4a between the latter and the sleeve. The interior diameter of the sleeve is only slightly greater than the width of the plates and with such an arrangement the rod serves to maintain the sleeve from substantial flexure transverse to its axis, or axial misalignment with the rod during charging. Another form of pencil electrode is shown in Figure 8a having a central conducting rod 1b of lead provided with a flange 2b burnt on to the rod or cast integrally therewith.

The thermoplastic retaining sleeve 3a surrounds the cylindrical body of active material 4a and has a lower closure disc 5b of thermoplastic material which fits the interior of the sleeve and is integrated therewith by the employment of a solvent. The central portion of the disc has a depression 6a circular in cross section, which may be formed in any suitable manner, and this depression serves to receive and locate the lower end of the rod when the parts of the electrode are assembled as hereinafter referred to. The top of the sleeve is closed by a ring 7a of thermo-plastic material which fits in the sleeve and is integrated therewith by the employment of a solvent. The ring 7a fits the exterior of the lead rod and its underside bears on the flange 2b. A lead conducting member 8a having a central opening which fits the projecting portions of the rod 1b is burned to the latter and has an upwardly projecting terminal lug (not shown). The conducting member 8a bears at its underside on the ring 7a. As will be seen from the dotted portion of Figure 8a two or more of the pencil electrodes may depend from a single lead conducting member or bar 8a to provide a positive plate, but as the pencils are not connected together, except at their upper ends by the conducting member 8a each retaining sleeve can expand under action of expansion or growth of the active material therein independently of the other retaining sleeve or sleeves of the plate.

To assemble the parts of a pencil according to Figure 8a, the disc 5b is secured, as above referred to, in the lower end of the sleeve 3a. The rod 1a having thereon below the flange 2b a briquette of active material, or a body of paste, of slightly less diameter than the interior of the sleeve 3a, is then slid into the sleeve from the upper end thereof until a portion 9b of the rod 1b which projects beyond the lower end of the briquette or paste enters the depression 6a. The ring 7a is then threaded on to the portion of the rod which projects above the flange thereof and the ring is secured to the upper portion of the sleeve by solvent. Finally the conducting member 8a is threaded on to rod 1b so that it bears on the ring 1a and the member 8a is then burned to the rod.

Whether a briquette of active material or paste is employed it may be united with the rod prior to assembly, with the retaining sleeve, as by providing collars or projections from the rod which enter the briquette material or paste during moulding of the material or paste on the rod. In either case the active material will become more firmly united with the rod during charging and thus the weight of the active material will be borne entirely by the rod so that normally the sleeve, which is also carried by the rod, will be in unstressed condition. However, as will be appreciated if the active material expands or grows when the electrode is in use the sleeve will extend longitudinally.

Figure 9a shows diagrammatically in plan view a four pencil positive plate 10a in which the pencils are according to Figure 8a, and depend from a common conducting bar 8a which is provided with a terminal lug (not shown). The negative plate comprises five pencils each according to Figure 8a and depending from a common conducting bar 11a also provided with a terminal lug (not shown). The plates are supported so as to depend into an electrolyte container and are held in the relative positions shown in the figure by any suitable means. As will be appreciated the retaining sleeves of the negative pencils will confine the spongy lead therein and will also expand under action of expansion of the lead.

The secondary battery or accumulator shown in Figure 9 has positive and negative electrodes 34a, 35a and an acid container 36a which is of any suitable acid resisting material, for example, moulded ebonite or thermosetting plastic. The positive electrode comprises a retaining sleeve 36b united at its upper and lower ends respectively to a ring 37a and a disc 38a both of thermoplastic material and secured to the sleeve. A lead rod 38b projects downwardly through the opening in the ring 37a and into contact with active material 39a filling the interior of the sleeve, the rod being provided with collars or other projections which prevent relative movement between the paste and the rod. The upper end of the rod has a post provided with a terminal 40a.

The negative electrode comprises perforated lead sheeting 41a bent to provide an annular space to contain active material and the upper part of the sheeting has burned thereto a post provided with a terminal 42. The negative electrode surrounds the positive electrode in spaced relation thereto and the electrodes are supported in the container with their lower ends above the bottom thereof.

Figure 10 shows a secondary battery according to the invention suitable for use in hand torches and comprises an outer case 43 of acid resisting material, for example, of ebonite or thermoplastic synthetic resin, having tightly fitting within it a negative electrode 44 which comprises a perforated lead tube 45 bent outwardly at its end tightly to fit the case 43, the space between the latter and the lead tube being filled with active material 46. The lower portion of the negative electrode has embedded in the active material the upper end of a conducting rod or wire 47 which at its other end is secured to a metal negative contact terminal 48 for engaging a spring in the torch case, and projecting from and secured to the bottom wall of the casing. The positive electrode may be according to Figure 1 except that the upper end of the rod 49 projects through an opening in the top wall of the case and has formed at the upper end a disc providing a positive contact terminal. The casing is filled with electrolyte comprising a gel preferably isinglass containing dilute sulphuric acid.

In Figure 11 the multi-pencil positive electrode or plate has the pencils arranged in two parallel laterally spaced rows 50 and 51, the negative electrode or plate 52 being of perforated sheet lead and of box form, and provided with a negative terminal lug 53. The upper lead bars 54, 55 of the rows of pencils are connected by a bridge piece of lead 56 burned to the bars and having a positive terminal 57.

In manufacture the pencils are filled with pure red lead paste and the negative box electrode with litharge which are respectively converted into PbO2 and sponging lead during charging.

The walls of the box which face the rows of positive pencils may be formed so as to have vertical cylindrical depressions alternating with vertical projections so that the side faces of the negative electrode considered in plan view conform with the pencils. The latter will then project into the grooves but no separator of inert spacing material will be necessary as the sleeves being of non-conducting material will prevent contact of the negative electrode with the pencils of active material of the positive electrode.

Referring now to Figures 12 to 14 there will now be described a method of and means for manufacture of retaining sleeves for electrodes according to the invention. 58 is an electrically heated oven or chamber having its ends provided with inlet and outlet slots 59, 60 for the passage into and from the oven of a strip 61 of thermoplastic synthetic resin. Within the oven are a pair of upper and lower rollers 62, 63 which are of the same diameter and may be smooth surfaces if the strip is not to be perforated. The rollers are rotatably mounted and geared together to rotate at the same speed and the upper roller is spring urged into contact with the lower roller and is adjustable to determine the pressure of contact.

The lower roller has a plurality of circular rows of sharp pointed pins 64 the diameter of the body of each of which is substantially $\frac{1}{64}$ of an inch and the upper roller has a plurality of continuous peripheral grooves 65, one for each row of spikes, the grooves being of slightly greater width than the diameter of the pins so that there is no contact of the spikes with the sides of the grooves, and the latter being of a depth so that the pointed ends of the spikes do not contact with the bottoms of the grooves.

Secured to a bracket below the outlet slot are a pair of bearings 66, 67 for a mandrel 68 of steel or hard rubber, the mandrel having a spindle one portion 69 of which is screwthreaded for engagement by a half nut 70 pivoted at 71 to the adjacent side of the oven and which with the half bearing 72 forms the bearing for that end of the spindle. The other end of the spindle is adapted to rotate and slide in the other bearing 67. The rollers and the mandrel may be rotated by a motor and as will be understood rotation of the mandrel will cause by virtue of the screw and half nut, traverse of the mandrel axially. When the machine is to operate the oven is heated to a temperature sufficient to soften the thermo-plastic synthetic resin to enable it to be pierced by the spikes during passage between the rollers, and its subsequent winding into helical form.

One end of a strip of thermo-plastic synthetic resin of sufficient length for producing a sleeve of the desired axial length, is then passed through the slot 59 into the oven and into the bight between the rollers 62, 63 which perforate the heater strip and feed it out of the outlet slot 60 to a sufficient distance to enable the end portion to be attached in any suitable manner to one end of the adjacent end of the mandrel. The feeding by the rollers is then temporarily interrupted and the end portion of the strip attached to the mandrel while the latter is also stationary. The mandrel and rollers are then rotated and the strip is helically wound on to the mandrel. The half nut is then disengaged from the screwed portion of the spindle and the mandrel removed from its bearings whereupon the sleeve is slid axially off the mandrel. If the end portions of the strip have not been, prior to operation thereon, cut so that the ends of the sleeve are in planes at right angles to the sleeve axis the ends of the sleeve are cut off and the sleeve is then ready for embodiment in an electrode.

In Figure 15, 66 is an electrically heated oven having therein rotatably mounted thereon a roller or mandrel 67 having a screw threaded shaft 68 which is engaged by an internally screw threaded half nut 69 which is pivoted to a member (not shown) fixed within the oven, so that it can be moved into and out of engagement with the shaft. The other end of the roller projects through an opening 70 in the adjacent oven wall 71, which wall is preferably of heat insulating material, into a cooling chamber 72. Above the roller 67 and adjacent to the wall 71 is a piercing roller 73 having radially projecting pointed spikes which are arranged in a helical row and of a pitch corresponding to the screw of the shaft 68. The roller 73 is spring urged towards the roller 67 so that a heated strip of thermo-plastic will be pierced as the rollers rotate. The rollers 67 and 73 are geared together to rotate at the same peripheral speed and may be driven through the gearing by a motor. The strip of thermoplastic material enters the oven through a slot (not shown) in the wall 74 rearward of the rollers 67 and 73 and which is on the same level as the bight between the rollers 67 and 73.

With the foregoing arrangement a strip of thermo-plastic material of a length suitable to provide a sleeve for an electrode to be manufactured is projected through the slot so that its inner end is held in the bight between the rollers 67 and 73. When the part of the strip in the oven has become softened by the heat the rollers are set in rotation and the strip is helically wound on the roller 67 and at the same time pierced by the spikes. Axial traverse of the roller 73 by virtue of the screw and half nut, causes movement thereof through the opening 70 into the cooling chamber where the sleeve becomes set so avoiding possibility of flow of the thermoplastic after it has been wound and pierced, it being understood that such provision in particular avoids the holes produced by the piercing from becoming filled.

Figures 16 and 17 illustrate manufacture of retaining sleeves of hard rubber for positive pencil electrodes. An extruded or moulded tube 74 of such material is taken and slid on to a mandrel 75 of the same exterior diameter as the interior diameter of the tube 74. The mandrel 75 is mounted between lathe centres carried by a suitable support or base having provision for rotating the mandrel in the direction of the arrow, Figure 17, and traversing it axially in the direction of the arrow, Figure 16. The sleeve is cut into the form of a helix by a rotary circular saw or knife 76 arranged at a suitable angle and which is rapidly rotated in the direction of the arrow, Figure 17, during rotation and traverse of the mandrel so as to cut through the sleeve to the periphery of the mandrel so that the side wall of the sleeve is changed to helical form. If desired the tube 74 may be of moulded or extruded thermo-plastic synthetic resin or thermo-setting resin and cut to helical form according to Figures 16 and 17.

When the tube has been so cut it is removed from the mandrel and may be assembled with other parts required to produce a pencil electrode as hereinbefore described.

A further method of manufacture of retaining sleeves, Figure 18, may comprise dipping cylindrical cores in a dispersion or solution of rubber or thermo- or thermo-setting plastic and then cutting the side wall as described with reference to Figures 16 and 17, to form it into a helix. The cores may be dipped a plurality of times in the dispersion or solution in order to build up their wall to the desired thickness.

It is to be understood that the invention is not confined to lead-lead peroxide storage batteries as it may be applied to alkaline storage cells in which the conducting members are of nickel-plated steel and the active material nickel peroxide mixed with graphite for a positive electrode, and finely divided iron and graphite for the negative electrode.

Further the retaining sleeves may be of other thermo-plastic synthetic resins than that before referred to. For example, styrene and distrene thermo-plastics may be employed.

Finally the retaining sleeves are not confined to cylindrical formation as the helical turns may be of square, rectangular, oval, hexagonal or other configuration when viewed in the direction of the axis of the sleeve.

I claim:

1. An electrode for secondary or storage batteries comprising a conducting member, active material in contact therewith and a preformed helically wound self-sustaining sleeve containing said active material, said helical sleeve being composed of a resilient ribbon-like material which is inert to the electrolyte and to electrolytic action, the helices being spaced apart to permit passage of electrolyte therebetween so as to contact the active material, said sleeve supporting said active material in a resilient relationship.

2. An electrode as claimed in claim 1 wherein the sleeve is composed of thermo-plastic material and wherein the conducting member is a rod extending from the exterior of the sleeve axially therethrough, said rod being secured to one end of said sleeve, and wherein the active material is of cylindrical form and is disposed between the rod and the interior of the sleeve.

3. An electrode as claimed in claim 2 wherein the other end of the sleeve has secured thereto a cover of thermo-plastic material, the inner face of which fits the adjacent end face of the active material.

4. Retaining means for the active material of pencil electrodes of storage batteries comprising a self-sustaining tubular member of electrical insulating material inert to electrolyte, said member consisting of end portions and a resilient ribbon-like strip connecting the end portions and helically wound about the tube axis with the edges of the convolutions being spaced apart whereby electrolyte can gain access to the interior of the sleeve.

5. Retaining means for the active material of pencil electrodes of storage batteries comprising a self-sustaining tubular member of electrical insulating material inert to electrolyte, said member consisting of end portions and a plurality of resilient ribbon-like strips each connected at its ends to the end portions, each strip being helically wound about the tube axis, with the edges of each strip being continguous and parallel to adjacent strips.

6. Retaining means as claimed in claim 5 wherein the tubular member is of rubber and the strips are integrally united with the end portions.

PELHAM SALISBURY-ROWSWELL.

REFERENCES CITED

The following references are of record in the file of this patent:

UNITED STATES PATENTS

| Number | Name | Date |
|---|---|---|
| 620,172 | Philippart | Feb. 28, 1899 |
| 1,213,923 | Lux | Jan. 30, 1917 |
| 1,363,729 | Haunz | Dec. 28, 1920 |
| 1,576,588 | Finstone | Mar. 16, 1926 |
| 2,015,636 | Hamilton | Sept. 24, 1935 |
| 2,176,427 | Kershaw | Oct. 17, 1939 |
| 2,195,211 | Hall | Mar. 26, 1940 |
| 2,225,026 | Welsh | Dec. 17, 1940 |